United States Patent [19]

Hanlet

[11] 4,448,321

[45] May 15, 1984

[54] FASTENING SYSTEM

[75] Inventor: Jacques M. Hanlet, Loxahatchee, Fla.

[73] Assignee: Intent Patent A.G., Liechtenstein

[21] Appl. No.: 421,278

[22] Filed: Sep. 22, 1982

[51] Int. Cl.³ .............. B29C 27/00; B32B 7/08; B32B 7/12; B65D 6/32

[52] U.S. Cl. .................. 220/4 R; 29/469.5; 29/513; 156/69; 156/91; 206/328; 206/807; 220/76; 403/242; 403/244; 403/267; 403/268

[58] Field of Search ............. 220/75, 76, 3.8, 3.92, 220/3.94, 359, 307, 309, 310, 4 R; 229/2.5 R, 45 R; 29/469.5, 513; 156/91, 92, 69; 206/807, 328, 334, 45.34, 461, 464, 465; 403/252, 244, 242, 268, 267, 266

[56] References Cited

U.S. PATENT DOCUMENTS

| | | | |
|---|---|---|---|
| 2,038,826 | 4/1936 | Carroll | 220/91 |
| 2,322,163 | 6/1943 | Schmidt | 403/244 X |
| 2,489,245 | 11/1949 | Sola | 220/3.8 X |
| 2,887,525 | 5/1959 | Lewis | 220/3.94 X |
| 2,915,214 | 12/1959 | Frankel | 229/2.5 R X |
| 3,018,140 | 1/1962 | Portz et al. | 403/268 X |
| 3,158,224 | 11/1964 | Van Name et al. | 403/268 X |
| 3,164,478 | 1/1965 | Bostrom | 229/2.5 R X |
| 3,660,887 | 5/1972 | Davis | 403/268 X |
| 3,786,982 | 1/1974 | Rakes et al. | 229/2.5 R |
| 3,825,148 | 7/1974 | Hunter et al. | 220/359 |
| 3,895,178 | 7/1975 | Huibrechtse | 220/3.94 X |
| 4,146,167 | 3/1979 | Pascus | 229/45 R |

FOREIGN PATENT DOCUMENTS 852515 8/1952 Fed. Rep. of Germany ...... 403/242

Primary Examiner—Allan N. Shoap
Attorney, Agent, or Firm—Morton J. Rosenberg

[57] ABSTRACT

A fastening system (10) for fixedly securing a first member (12) and a second member (14) of a container (16). The first member (12) is generally planar in contour and the second member (14) includes a fastening portion (30) defining a dome configuration which is drawn from the second member (14). A slot (36) is cut into the fastening portion (30) on one side thereof with the other side defining a cavity (34). The first member (12) is inserted through the slot (36) and extends to a first member portion (38) contained within the cavity (34). The first member portion (38) is bent into a bent portion (38) out of alignment with the slot (36). An adhesive element (42) is inserted within the cavity (34) to substantially fill the same and adhesively secure the first member (12) to the second member (14). In this manner, first member (12) is fixedly secured in a substantially tamper-proof manner to second member (14).

2 Claims, 4 Drawing Figures

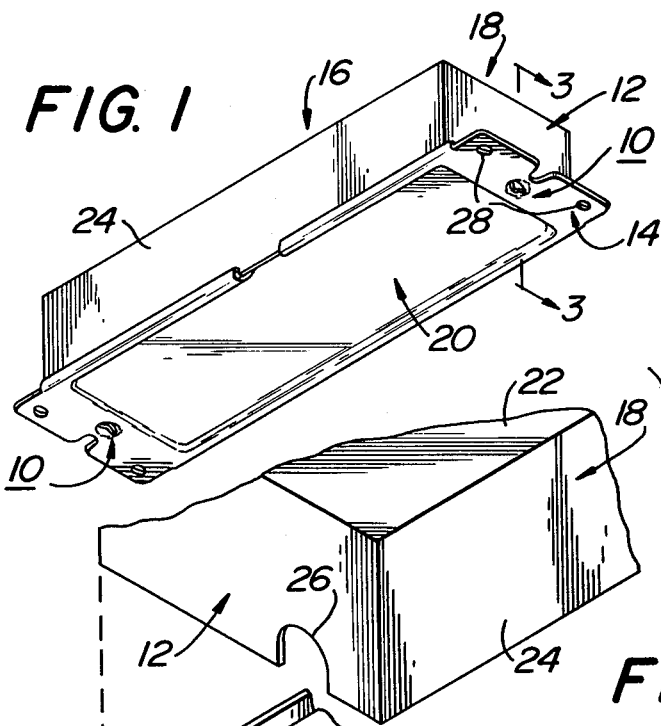
FIG. 1
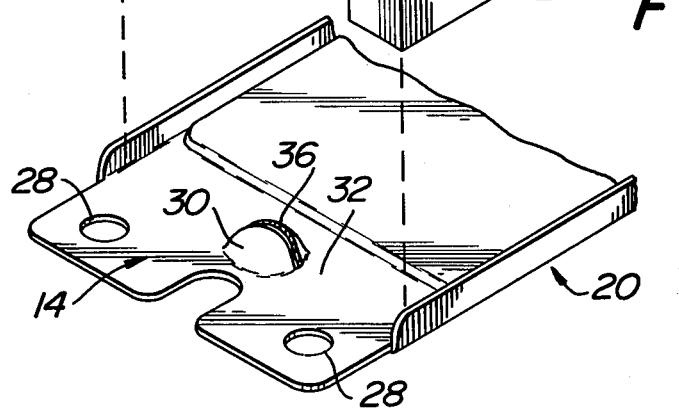
FIG. 2
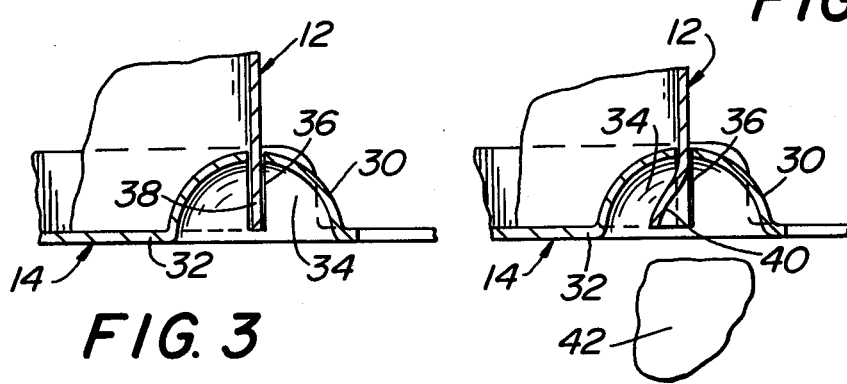
FIG. 3
FIG. 4

FASTENING SYSTEM

BACKGROUND OF THE INVENTION

1. Field of the Invention

This invention pertains to fastening systems for fastening one member to another. In particular, this invention relates to fastening systems which allow locking engagement between two members in a low cost easily fabricated system. More in particular, this invention pertains to a fastening system for providing a substantially tamper-proof locking arrangement for a container. Still further, this invention directs itself to a fastening system where a first member is drawn or otherwise formed into a volumetric contour configuration having a slot for reception of the first member insert. More in particular, this invention directs itself to the insertion of the first member which may be planar in contour into the slot and the cavity formed by the second member volumetric configuration. Still further, this invention pertains to a fastening system where a portion of the first member is inserted into a cavity formed in a second member and deformed out of alignment with the entrance opening to provide a fixed engagement between the first and second members. Additionally, this invention directs itself to the insert of an adhesive bonding element into a cavity formed in a second member having a first member inserted therein for adhesively securing the first member to the second member.

2. Prior Art

Fastening systems for fastening one member to another are well-known in the art. Additionally, fastening systems for providing a fixedly secured and enclosed container for goods contained therein, such as electronic equipment, is also well-known in the art. However, in some prior art fastening systems, adhesive securement has been used for locking and engaging a box to its cover. In such systems, the adhesive may be easily removed and removal of the locked members may be attained without any external appearances of such. Additionally, some previous types of adhesive bonding, under certain environmental conditions, may become pliable and thus, the locked members may be removed each from the other. Such adhesive bonding systems do not provide for a mechanical and structural lock between the secured members.

In other types of prior art fastening systems, mechanical securement is attained by threaded securement or bolt type systems. In such prior art mechanical locking devices, threaded openings or through openings must be provided in alignment each to the other and additionally, bolts or screws must be provided for the locking system. This type of prior art structural fastening increases the overall costs and complexity of fabrication of the fastening devices. In still some other types of prior art systems, rivets are used to securely fasten members of a container and provide tamper-proof securement devices. However, once again, alignment of openings is necessary with the increased costs of the rivets and labor time in providing the securement of the rivets to the members.

In some other types of prior art fastening systems, tab/slot fastening methods are used. Such tabs/slots further increase the costs of fabrication of the fastening system, due to the fact that such tab/slot fastening devices must include extreme alignment tolerances and further, may be removed by unauthorized personnel in a simple manner.

Other prior art fastening systems include welding or like techniques, however, once such members are welded together, the removal of such is extremely difficult and generally results in the destruction of the locked members.

Additionally, other prior art systems for locking members each to the other generally increase the cost of fabrication and manufacture of the parts to be locked or secured. Further, such prior art systems may in some cases not visually show that a removal of the securement devices has taken place. In other cases where the secured devices are welded or fused together, the removal of the secured members may destroy the mechanically secured elements.

SUMMARY OF THE INVENTION

A method for securing a first member to a second member which includes the step of forming a volumetric contour in the second member defining a cavity in the second member. Subsequent to the forming of the volumetric contour, a slot is established in the volumetric contour and a first member is inserted into the open chamber or cavity of the second member. Finally, the first member is fastened internal within the open chamber of the second member.

BRIEF DESCRIPTION OF THE DRAWINGS

FIG. 1 is a perspective view of a container, showing the first and second members to be fixedly secured each to the other;

FIG. 2 is a perspective view partially in cutaway, showing the first member and second member in blow-out;

FIG. 3 is a sectional view of the fastening system taken along the section line 3—3 of FIG. 1; and, FIG. 4 is a sectional view of the fastening system showing the epoxy element being inserted into a cavity formed in the second member for adhesively securing the first and second members together.

DESCRIPTION OF THE PREFERRED EMBODIMENTS

Referring now to FIGS. 1-4, there is shown fastening system 10 for fastening and rigidly securing first member 12 to second member 14. In overall concept, the system and method as herein described may be generally applied to a wide variety of first and second members 12 and 14. However, in particular, fastening system 10 may be applied to container 16 as shown in FIG. 1, having upper compartment 18 to be fixedly secured to base member 20.

In many cases, it is desired to form a fixed securement between upper compartment 18 and base member 20 to form a relatively tamper-proof compartment for goods contained within container 16. It is especially important where warranties are given by the manufacturer to consumers dependent upon the non-tampering with elements contained within container 16. In system 10 to be described in following paragraphs, it will be clearly seen that where upper compartment 18 is removed from base member 20, it is a relatively simple task to determine whether upper compartment 18 has been forcibly removed from base member 20. Fastening system 10 and the method of forming same is especially useful where container 16 contains an electronics package having elements which may be easily damaged when upper compartment 18 is removed from base member 20.

Although particularly useful for containers 16 having compartment areas to be joined in fixed constrainment each to the other, it is to be clearly understood that fastening system 10 and the method of establishing same is applicable to any first and second members useful for a wide range of securing uses.

In the embodiment shown in FIGS. 1 and 2, container system 16 may include upper wall 22 and sidewalls 24, as shown. In this embodiment, the end walls serve as first members 12, as has previously been described. Base member 20 may be essentially planar in contour and may serve as second member 14 for container 16.

First member 12 is generally planar in contour and may be formed of a metallic composition such as aluminum, steel, or some like relatively rigid composition material which may be deformed or bent. Additionally, base member 20 serving as second member 14 for the purposes of this description, may be generally planar in contour and also formed of a metallic composition which also has the ability of being deformed. Second member 14 may be formed of aluminum, steel, or some like metallic composition. In the concept as herein described, it is desired to join or fixedly secure upper compartment 18 to base member 20 in a manner which is substantially tamper-proof. Container 16 may be an electronics package container having opening 26 formed in first member 12 to provide an external lead connection. Additionally, base member 20 may include through openings 28 for mounting purposes to a base surface, not important to the inventive concept as herein described.

Fastening system 10 includes a mechanism for releasably capturing first member 12 within at least fastening portion 30 of second member 14. As can be seen in FIGS. 2-4, the mechanism for releasably capturing first member 12 includes fastening portion 30 being out of plane with respect to surrounding area 32 of second member 14. Fastening portion 30 of second member 14 extends above the generally planar surface of surrounding area 32 and includes a volumetric contour in dome shaped configuration defining open ended chamber 34.

Dome shaped fastening portion 30 has a slot 36 formed therethrough, as shown in FIGS. 2-4. Slot 36 has a width substantially equal to, but slightly greater than, the width of first member 12 to allow insert of first member 12 through slot 36 and internal to open ended chamber 34. Thus, first member 12 which is generally planar in contour is matingly engaged with fastening portion 30 through insert within slot 36 and defines first member portion 38 internal to open ended chamber 34.

In general, the volumetric contour of fastening portion 30 may be formed in one-piece formation with respect to surrounding area 32 of second member 14. Fastening portion 30 may be drawn into a hemispherical volumetric contour, as is shown, or another type of contour, not important to the inventive concept with the exception that such contour provide an open ended chamber 34 and a slot 36 for insert of first member 12 therein. Formation of fastening portion 30 may be through drawing, impact forces, or some like technique not important to the inventive concept as is herein described.

Fastening system 10 further includes a mechanism for securely fastening first member 12 within fastening portion 30 of second member 14, as is shown in FIG. 4. The mechanism for securely fastening first member 14 includes bent portion 40 of first member portion 38 being bent out of plane with respect to a surrounding section of first member portion 38 subsequent to the insert of first member 14 within slot 36 and open ended chamber 34. In this manner, since the opening formed by slot 36 is planar in contour, first member 12 is fixedly secured to fastening portion 30 and consequently, to second member 14. Removal of first member 12 from fastening portion 30 is inhibited by bent or out of plane portion 40 of first member 12 when taken with respect to planar slot 36.

To further maintain first member 12 in fixed securement to second member 14, a bonding of second member 14 to first member 12 within open ended chamber 34 is accomplished by use of an adhesive such as epoxy element 42. Use of epoxy element 42 allows for adhesive securement between first member 12 and second member 14 by insert of epoxy element 42 into open ended chamber 34 wherein such contacts first and second members 12 and 14 within open ended chamber 34 of fastening portion 30. Epoxy element 42 may be inserted into open ended chamber 34 substantially filling chamber 34. Epoxy element 42 upon insert may be resilient and flexible in nature and allowed to cure after or subsequent to insert into open ended chamber 34. The remaining portion of epoxy element 42 may then be scraped or otherwise removed from an outer surface of second member 14 to provide a continuous and unitary fastening system 10.

Finally, fastening system 10 allows first member 12 to be fastened and locked to second member 14 by deformed bent portion 40 of first member portion 38. The deformation portion 40 within open ended chamber or cavity 34 defining fastening portion 30 prevents bent portion 40 from being retracted through slot 36 to thus secure or lock members 12 and 14 each to the other. Subsequent to this, members 12 and 14 are sealed and made substantially tamper-resistant by adding adhesive/sealant or epoxy composition element 42 internal to cavity 34.

The method for securing first member 12 to second member 14 as herein described includes forming fastening portion 30 into a volumetric contour in second member 14 which defines open chamber or cavity 34. Forming fastening portion 30 may include drawing second member 14 into the predetermined volumetric contour which may be dome shaped or hemispherical in overall configuration.

Once fastening portion 30 has been formed as previously described, slot 36 may be formed in the overall contour as is clearly shown. Deforming of slot 36 may be prior to the drawing step, or subsequent thereto dependent upon the tooling being used.

First member 12 is then inserted into open chamber or cavity 34 through slot 36 to provide a first member portion 38 internal to cavity 34. First member 12 is then fastened internal within open chamber or cavity 34 of second member fastening portion 30. First member portion 38 is bent or deformed into bent portion 40 internal to open chamber 34. In this manner, first member 12 is fixedly secured to second member 14.

First member 12 is bonded to second member 14 within open chamber 34 by adhesive securement and adhesively securing second member 14 to first member 12 within cavity 34. This step is accomplished by the insertion of epoxy element 42 or some like adhesive element which is inserted to substantially fill open ended chamber 34. Curing of epoxy element 42 provides a relatively rigid securement mechanism for members 12 and 14.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:
1. A closed container comprising:
   (a) an open container member having an upper wall member and a sidewall member secured each to the other;
   (b) a cover member having a dome member formed thereon defining an open chamber, said dome member having a slot formed therethrough for insert therethrough of at least a portion of said sidewall member into said dome open chamber, said portion of said sidewall member within said open chamber being deformed to fasten said cover member to said open container member; and,
   (c) adhesive securement means inserted within said open chamber for sealing said sidewall portion and said cover member together.

2. A method for forming a closed container including the steps of:
   (a) providing an open container having an upper wall member and a sidewall member secured each to the other;
   (b) forming a dome member defining an open chamber in a cover member for said open container;
   (c) cutting a slot in said dome member for insert of a portion of said sidewall member into said open chamber;
   (d) deforming said portion of said sidewall member internal said open chamber for fastening said cover member to said open container; and,
   (e) inserting adhesive within said open chamber to seal said sidewall member portion to said cover member.

* * * * *